June 30, 1959 J. R. HAMILTON 2,892,364
TURBINE POWER TRANSMITTING ASSEMBLY
Filed Sept. 18, 1956 4 Sheets-Sheet 1

INVENTOR.
JOSEPH R HAMILTON
BY
ATTORNEY

June 30, 1959 J. R. HAMILTON 2,892,364
TURBINE POWER TRANSMITTING ASSEMBLY
Filed Sept. 18, 1956 4 Sheets-Sheet 2
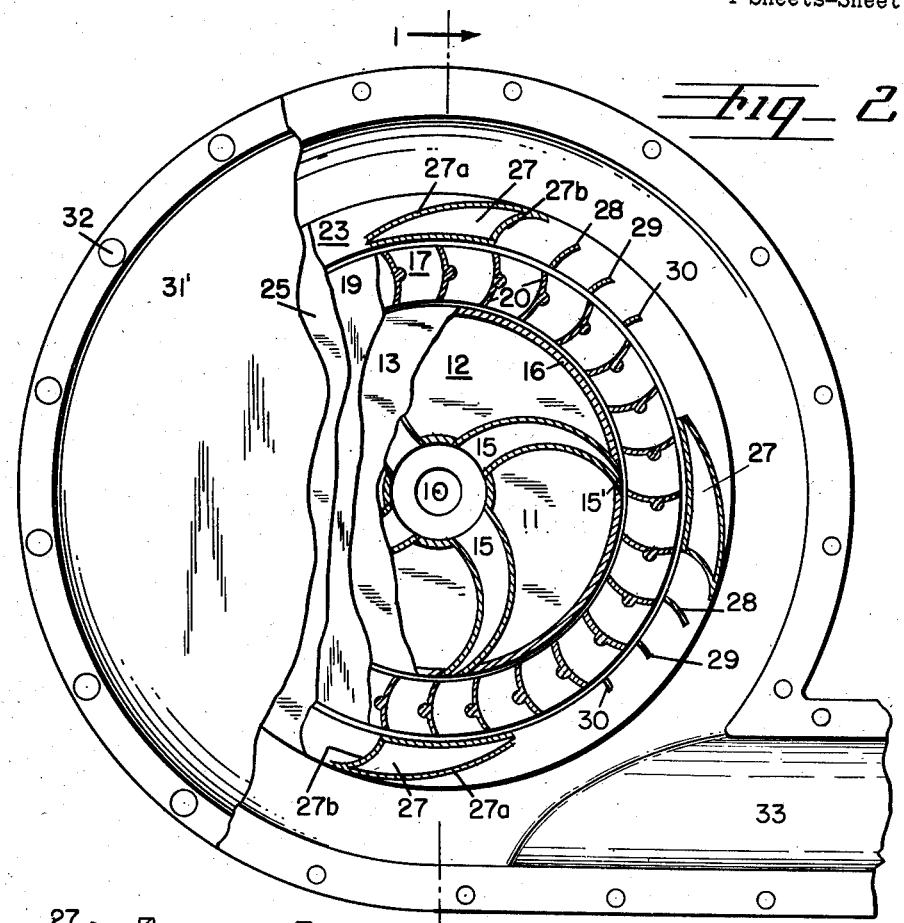
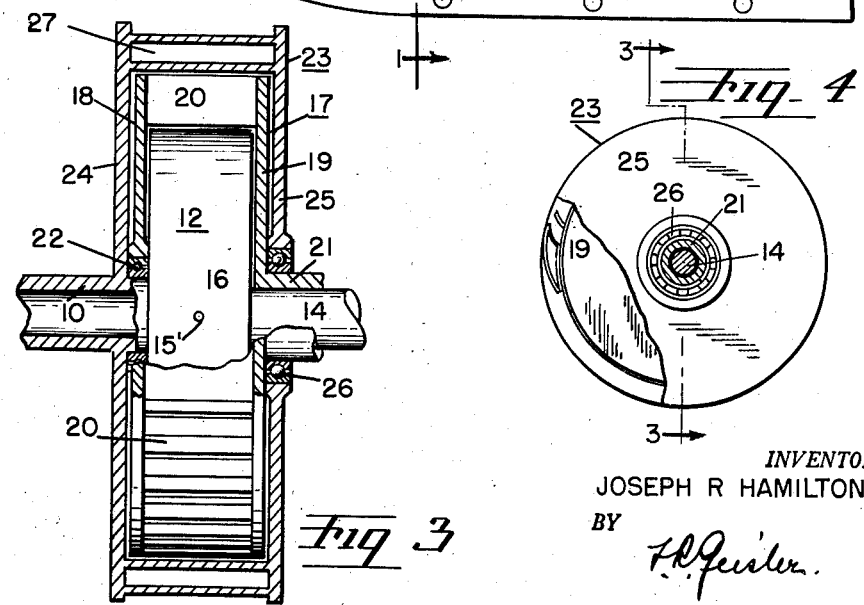
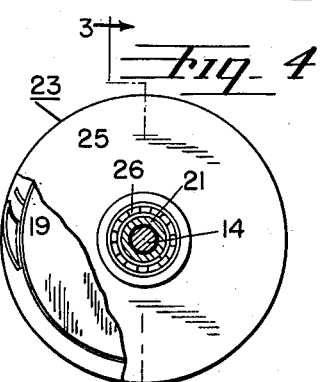
INVENTOR.
JOSEPH R HAMILTON
BY
ATTORNEY

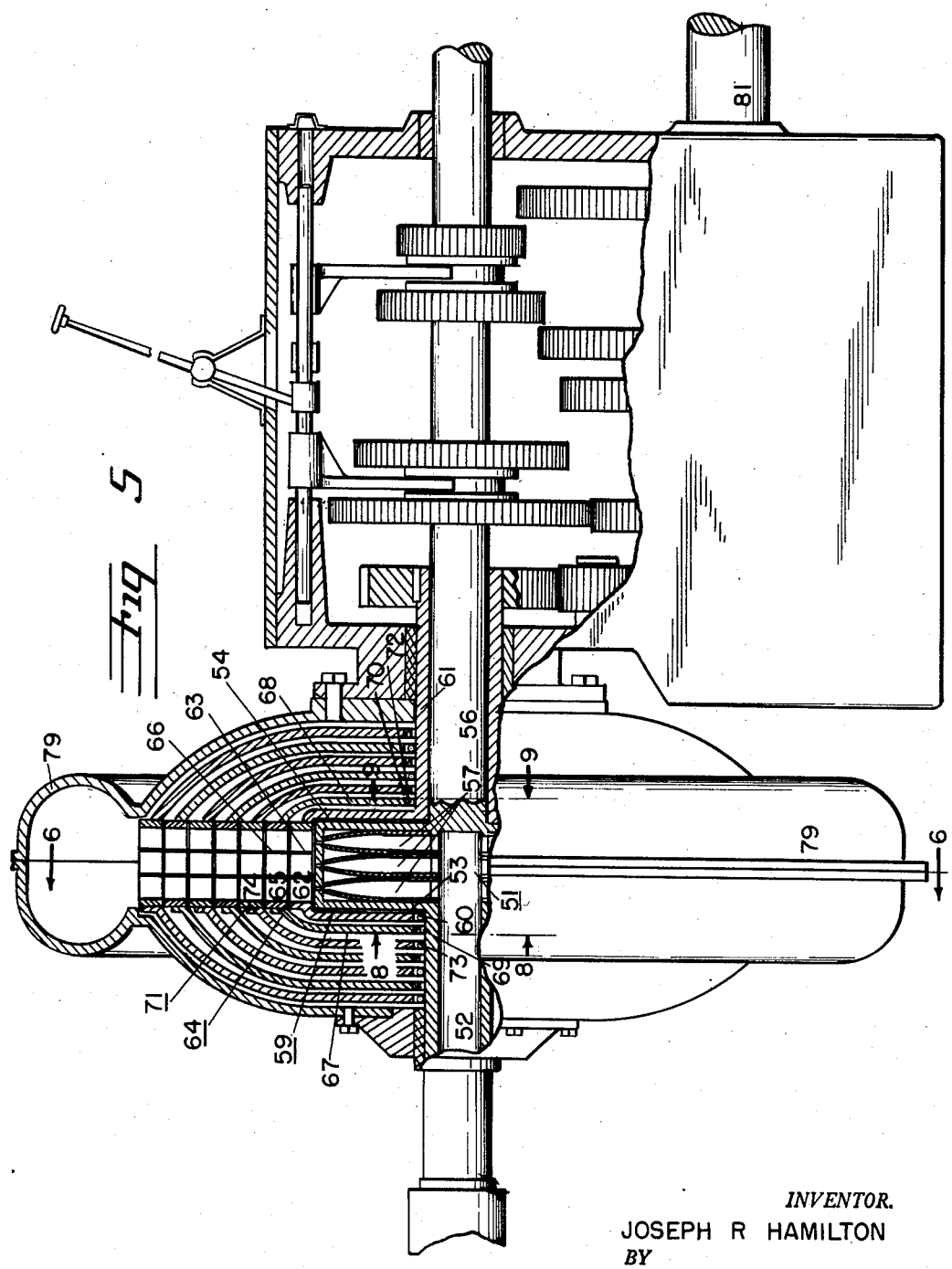

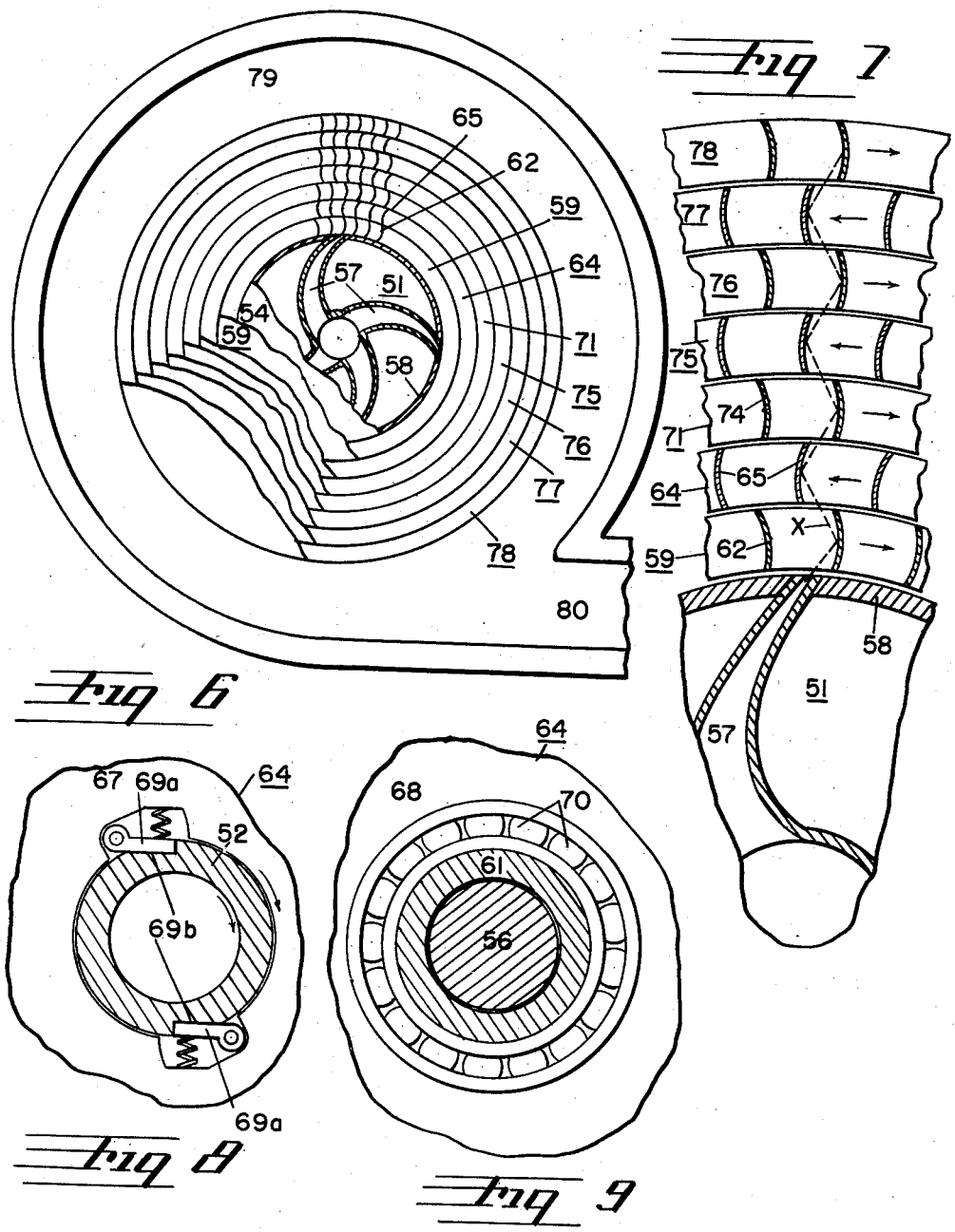

United States Patent Office 2,892,364
Patented June 30, 1959

2,892,364

TURBINE POWER TRANSMITTING ASSEMBLY

Joseph R. Hamilton, Baker, Oreg.

Application September 18, 1956, Serial No. 610,460

10 Claims. (Cl. 74—718)

This invention relates in general to the converting and transmitting of power through the medium of a rotary motor of the turbine type.

More specifically, the present invention relates to a fluid driven rotor assembly in which the fluid pressure, the reaction of the pressure, and the centrifugal force imparted to the fluid are all made use of in producing the ultimate driving power which is developed and transmitted by the assembly.

The general object of the invention is to provide a highly efficient power transmitting device in which a compound rotor assembly is employed driven by fluid pressure, such fluid pressure being either water pressure, or, with a slightly modified construction, being steam or gas pressure.

An additional object of the invention is to provide an improved power transmitting assembly which will operate efficiently even when the pressure of the actuating fluid delivered to the assembly drops below that which was normally expected.

A still further object of the invention is to provide an improved rotary motor or turbine assembly in which the usual torque strain on the outside housing or casing for the motor is substantially eliminated and which therefore enables the assembly construction to be of lighter weight.

The manner in which these objects and other advantages are attained with the present invention, and the construction, combination and arrangement of parts in the power assembly, will be described briefly with reference to the accompanying drawings, wherein:

Figure 2 is an elevation, part of which is a section taken on line 2—2 of Figure 1 and part of which is an elevation showing some of the successive side wall portions broken away;

Figure 3 is a sectional elevation of the composite rotor or turbine removed from the outer housing, the section being taken on line 3—3 of Figure 4, but drawn to a larger scale and with part of the rim of the inner portion of the primary rotor broken away for clarity;

Figure 4 is an elevation of the rotor or turbine assembly taken from the right of Figure 3, but drawn to a smaller scale and showing part of the side wall broken away;

Figure 5 is an elevation, partly in section, of another form in which the device may be constructed when the fluid actuating pressure consists of steam or gas;

Figure 6 is a section corresponding in part to line 6—6 of Figure 5, but drawn to a smaller scale;

Figure 7 is a fragmentary, greatly enlarged, section of a portion of the multiple turbine assembly of Figure 6;

Figure 8 is an enlarged section on line 8—8 of Figure 5; and

Figure 9 is an enlarged section on line 9—9 of Figure 5.

Figure 1:
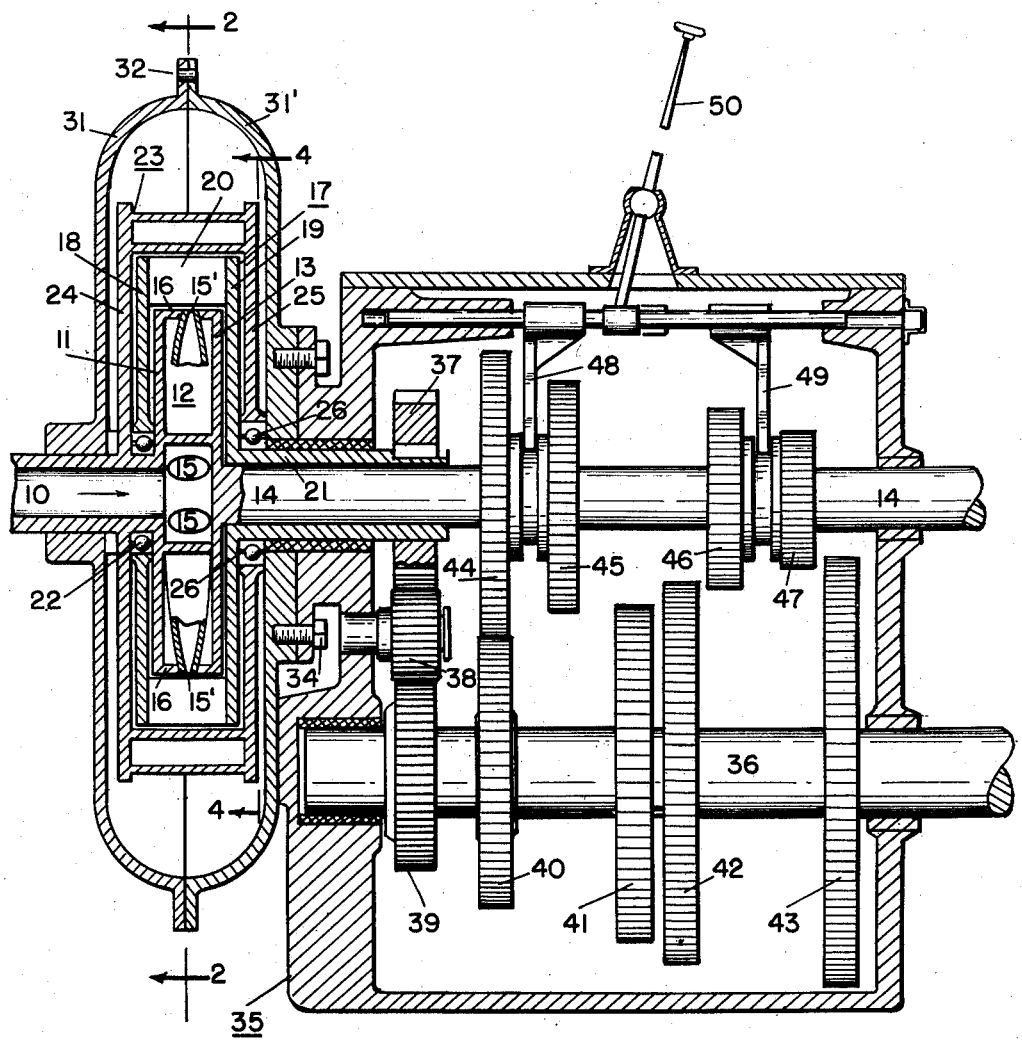
Figure 1 is a sectional elevation of one form in which the device may be constructed, particularly when hydraulic pressure constitutes the fluid actuating pressure, this sectional elevation being taken along the axis of the driving shaft and taken on the line indicated at 1—1 in Figure 2.

Referring first to Figures 1, 2 and 3, a hollow rotatable shaft 10 is integrally connected at its terminal end to a side wall 11 of an inner or primary rotor designated in general by the reference character 12. The opposite side wall 13 of this primary rotor is integrally connected with the solid shaft 14 which is axially aligned with the shaft 10. The side walls 11 and 13 of the primary rotor are joined together by the peripheral portion 16 of the rotor. The hollow shaft 10 is connected by means of a rotary joint (not shown) to a pipe connected to a source of fluid pressure (in this instance, hydraulic pressure) which fluid pressure serves as the actuating force for the device.

The primary rotor 12 has a plurality of identical, equally spaced involute, hollow spokes or nozzles 15 which lead from the center chamber of the rotor at the terminus of the hollow shaft 10 to the rotor rim 16. In the example illustrated the rotor has four such involute hollow spokes or nozzles. These nozzles terminate in restricted nozzle orifices 15' on the rotor rim. The nozzles and their discharging orifices 15' are all arranged to discharge jets at the same angularity with respect to the radii of the rotor at the points of discharge, and, as a result, the jets from these nozzles will be discharged in directions substantially tangent to the rotor rim.

A turbine wheel, designated in general by the reference character 17, surrounds the primary rotor 12 and is co-axial therewith. This turbine wheel 17 comprises a pair of parallel side members 18 and 19 which are joined by a series of equally-spaced curved peripheral blades 20. As shown in Figure 2, these blades 20 are positioned a very slight distance beyond the rim 16 of the rotor 12 and are curved oppositely from the hollow spokes or nozzles 15.

The side member 19 of the turbine wheel 17 is formed at its center with a hollow shaft 21 which surrounds and extends along the shaft 14 and which is co-axial with the shaft 14 and rotatable thereon. The opposite side member 18 of the turbine wheel 17 is rotatably supported on the shaft 10 by suitable ball bearings indicated at 22.

From Figure 2 and from the description thus far it will be evident that the delivery of water under head or hydraulic pressure into the shaft 10 and thus into the primary rotor 12, causing jets to be discharged from the nozzle orifices 15', will result in forces being exerted to rotate the primary rotor 12 in one direction (thus counterclockwise as indicated in Figure 2) and the surrounding turbine wheel 17 in the opposite direction, since the reaction of the discharging of the water jets from the nozzle orifices 15' causes the rotational force to be exerted in counterclockwise direction on the primary rotor 12 (as viewed in Figure 2), while the impingement of the water against the curved blades 20, under the force of the jets combined with the centrifugal force imparted to the discharged water, will produce a force to rotate the turbine wheel 17 clockwise. While these two rotating elements are thus designed and arranged to rotate in opposite directions, and do so rotate, nevertheless, as later explained, they do not rotate entirely independent of each other and the rotational forces developed in both elements are made use of for a common purpose. This is an important feature of the invention as will be later pointed out.

A third rotating element or wheel, designated in general by the reference character 23, surrounds the turbine wheel 17 and similarly consists of side members 24 and 25 joined together by peripheral blades. The blades on this third rotating element, however, differ from those on the turbine wheel 17 in that they are not all identical and are not arranged continuously. Instead, these blades are arranged in groups, the corresponding members in each group being similar and the groups corresponding in number to the nozzles 15 of the primary rotor 12.

The side member 24 of this third rotating element 23 is integral with, or rigidly secured to, the hollow shaft 10. The other side member 25 is rotatably supported on the hollow shaft 21 (Figures 1 and 3) by suitable ball bearings 26. Consequently, this third rotating element 23 rotates in unison with the primary rotor 12.

As shown in Figure 2, each group of peripheral blades on the rotating element 23 includes a hollow elongated member 27 which constitutes the main blade of each group and which is followed by a group of single blades such as 28, 29 and 30 of decreasing size, all of which slope in the same direction and are curved oppositely from the peripheral blades 20 on the turbine wheel 17. The hollow elongated main blade 27 of each group has a sloping forward wall 27a, shaped substantially as illustrated, which cuts down resistance to rotation of the element, and this hollow elongated main blade 27 has a curved back wall 27b which provides the working face of the blade. Each elongated main blade 27 is spaced radially outwardly from the end of a nozzle 15 of the primary rotor 12. Since the primary rotor 12 and this third rotating element 23 rotate in unison (thus rotating counter-clockwise as illustrated in Figure 2), while the turbine wheel 17 is driven in the opposite or clockwise direction, the jets from the nozzle end orifices 15', after first being impinged against the moving blades 20, will in turn be thrown against the surfaces 27b and the subsequent blade surfaces 28, 29 and 30, largely by centrifugal force, and thus give further impetus to the counter-clockwise rotation of the combined primary rotor 12 and the outermost rotating element 23.

A stationary housing composed of the two half sections 31 and 31' (Figure 1), having corresponding peripheral flanges secured together by bolts 32, encloses the turbine assembly and is formed with an outlet passageway 33 (Figure 2) by which the water, after being discharged from the rotating elements and collecting in the bottom of the housing can be carried off. The housing is mounted on the side of a stationary supporting frame 35 (Figure 1) by suitable screws 34. The supporting frame 35 supports the entire device and is provided with suitable bearings for the shaft 14 and for the hollow shaft 21, which extends along over a portion of the shaft 14, and also provides bearings for a power take-off shaft 36 to be mentioned presently. From the previous description, it is to be noted that the shaft 14 and the shaft 21, during the operation of the device, will always be rotated in relatively opposite directions. The driving forces represented by these two oppositely rotating shafts are combined to produce desired rotation, in a constant direction, of the power take-off shaft 36.

The power take-off shaft 36 (in Figure 1) is rotatably supported in the frame 35 and is mounted in parallelism with the shafts 14 and 21. A gear 37, keyed on the hollow shaft 21, meshes with an intermediate gear 38, which in turn meshes with the gear 39 keyed on the take-off shaft 36. A series of gears 40, 41, 42 and 43 of different diameters are also keyed on the power take-off shaft 36 and arranged for selective engagement respectively by the gears 44, 45, 46 and 47, which are splined on the shaft 14 for axial movement thereon and which are adapted to be shifted to desired engaging positions by bifurcated gear-shifting elements 48 and 49 in the well-known manner through operation of a manual shift lever 50.

Thus the two driving shafts 14 and 21 are both connected with the power take-off shaft 36 at all times, but variations in the relative speed ratio of these two driving shafts can be made to suit different conditions and requirements and utilized for obtaining the most advantageous and efficient employment of the hydraulic power being supplied at the time.

The modified form of the device shown in Figures 5 to 9, inclusive, illustrates a preferred form in which the invention may be carried out when steam or gas, instead of water, constitutes the fluid power to be utilized. The operation follows the same general principle but the construction of the rotating elements is modified so as to be better suited to the employment of steam or gas.

Referring to Figure 5, the steam or gas under pressure is delivered into the primary rotor 51 through the hollow shaft 52 which is shown integrally connected to the side wall 53 of the primary rotor 51. The hollow shaft 52 is connected through a suitable rotary joint (not shown) to the source of pressurized steam or gas. The other side wall 54 of the primary rotor 51 is integrally connected with the solid shaft 56 which is in axial alignment with the shaft 52.

The primary rotor 51 is formed with groups of identical involute nozzles 57, the groups being symmetrically spaced, as shown in Figure 6, and each nozzle terminates in a restricted jet orifice on the periphery 58 of this primary rotor.

A turbine wheel 59 surrounds the primary rotor 51 and is co-axial therewith. On one side this turbine wheel is supported on the shaft 52 by means of ball bearings indicated at 60. On the opposite side the hub of this turbine wheel 59 is extended to form the hollow shaft 61 which is rotatably mounted on the solid shaft 56. The shaft 61 and the shaft 56 provide the two oppositely rotated power shafts of the device. The two sides of the turbine wheel 59 are connected at the periphery by a series of groups of identical curved blades 62 (Figures 5 and 7). The number of blades in each group (thus the number shown being three), corresponds to the number of nozzles in each group of nozzles and the blades in each group are separated by partitions 63 extending in planes perpendicular to the rotational axis of the turbine wheel. These blades 62 are all curved in the same direction, their curvature being opposed to that of the nozzles 57 of the primary rotor 51, and the groups of blades are evenly spaced around the entire periphery of the turbine wheel 59. Thus, as indicated in Figures 6 and 7, the primary rotor 51 and the turbine wheel 59 rotate in opposite directions.

A second turbine wheel 64 surrounds the turbine wheel 59 and is similar to turbine wheel 59 except that it is larger in size for the most part and that the peripheral blades 65 (Figure 7) are curved in the opposite direction from the blades 62. The blades 65, however, are preferably the same width as the blades 62 (Figure 5) and also the blades in each group are separated from each other similarly by partitions 66 located in the same planes respectively as the partitions 63.

One side member 67 of this second turbine wheel 64 is supported on the shaft 52. The opposite side member 68 is supported on the shaft 61. A one-way clutch 69, which may be of any suitable construction, as, for example, the simplified form of one-way clutch shown in Figure 8, which consists of a pair of spring-actuated engaging elements 69a carried on the wall 67 and arranged so as to engage notches 69b on the outside of the tubular shaft 52, enables the second turbine wheel 64 to aid the primary rotor 51 in imparting driving rotation to the shaft 52 (and thereby to the shaft 56). The other side member 68 of the turbine wheel 64 is mounted on the shaft 61 by suitable ball bearings 70, as illustrated in Figure 9, and thus is rotatable freely on the shaft 61.

A third turbine wheel 71 (Figure 5) resembling the turbine wheels 59 and 64 similarly surrounds the second turbine wheel 64. The blades 74 of this third turbine wheel are curved in the same direction as the blades 62 of the turbine wheel 59, and the turbine wheels 59 and 71 rotate in the same direction, as indicated in Figures 6 and 7, and thus rotate oppositely from the primary rotor 51 and the second turbine wheel 64. This third turbine wheel 71 is also supported on the shafts 52 and 61. In this case, however, the turbine wheel is connected to shaft 61 by a one-way clutch indicated at 72 in Figure 5, which is similar to clutch 69, while the other side of the turbine wheel 71 is mounted on the shaft 52 by ball bearings indicated at 73. Thus, this third turbine wheel 71 cooperates with the turbine wheel 59 in driving the shaft 61.

In Figure 7 the broken line X indicates diagrammatically the course of a jet of pressurized steam or gas from a nozzle 57 during an instant of operation. It will be noted that the jet, by being impinged against the blades of successive turbine wheels, under the force with which it is discharged from the nozzle, and acted upon also by centrifugal force built up as the speed of operation increases, acts to drive the turbine wheels in the respective directions indicated by the arrows until the jet force is expended and the steam or gas is discharged from the periphery of the outermost turbine wheel.

In Figures 5, 6 and 7 a series of seven co-axial turbine wheels, similarly constructed, with the alternate wheels designed to be driven in the same direction, is shown. Since the additional turbine wheels 75, 76, 77 and 78, illustrated are similar to the turbine wheels 59, 64 and 71, previously described, it is not necessary to describe these additional turbine wheels in detail. The number of co-axial turbine wheels provided in such an assembly will depend upon the size of the device and the amount and pressure of the actuating operating fluid which normally is delivered to the device. Each of the turbine wheels under optimum operating conditions will contribute driving force either to the shaft 52 (and thereby to the connected shaft 56) or to the oppositely driven shaft 61. Thus, in the device as illustrated, the additional turbine wheels 75 and 77 are provided for the one-way clutch means engaging the shaft 52 like the turbine wheel 64, while the turbine wheels 76 and 78 have one-way clutch means engaging the shaft 61, the same as the turbine wheel 71.

The entire turbine assembly is enclosed in a housing 79 having a peripheral channel into which the expended discharged steam or gas is received and is provided with an outlet passageway 80 through which the used steam or gas passes from the housing.

The means by which the two oppositely driven shafts 56 and 61 (Figure 5) are both connected to the take-off power shaft, shown in part at 81 in Figure 5, is exactly the same as that previously described for the take-off power shaft 36 in the assembly illustrated in Figure 1, and consequently further description is not necessary.

In each of the two devices illustrated and described for the carrying out of the invention utilization is made of the various forces developed through the expenditure of the actuating fluid pressure for the driving of a single power take-off shaft. Since opposite or reactionary forces are harnessed through this means, and thus with members of the assembly being able to rotate in opposite directions, the torque strain on the supporting mounting and housing, which is a customary condition in other types of power transmitting devices, is substantially eliminated. One advantage of this is that the entire assembly may be of lighter weight construction.

It would, of course, be possible to make minor modifications in either of the devices illustrated without departing from the principle of the invention. Thus, other means than the shifting gears shown could be substituted for positively and selectively connecting the two oppositely rotating driving shafts to the common power take-off shaft. It is not intended to limit the invention otherwise than as set forth in the claims.

I claim:

1. In a turbine power transmitting assembly of the character described, a primary rotor, means for delivering fluid under pressure to the interior of said rotor, a plurality of identical, equally spaced nozzles leading from the interior of said rotor to the rotor periphery, said nozzles sloping in the same direction and arranged at the same acute angularity on said rotor periphery, whereby the discharging of fluid jets under pressure from said nozzles will exert a reactionary force tending to rotate said rotor in one direction, a rotor-driven shaft secured to and co-axial with said rotor, a rotatably-mounted turbine wheel surrounding said rotor and co-axial therewith, a plurality of equally-spaced blades on said turbine wheel surrounding said rotor periphery so arranged as to oppose and be operatively acted upon by the jets from said nozzles, whereby to cause rotation of said turbine wheel in a relatively opposite direction with respect to said rotor, a turbine driven shaft secured to said turbine wheel, a power take-off shaft, means connecting said take-off shaft with said rotor-driven shaft to cause rotation of said take-off shaft in one direction, and means connecting said take-off shaft with said turbine-driven shaft also to cause rotation of said take-off shaft in the same direction, whereby said oppositely rotating driven shafts will cooperate in producing rotation of said take-off shaft.

2. In a turbine power transmitting assembly of the character described, a primary rotor, a rotatably mounted pipe delivering fluid under pressure to said rotor, said rotor secured to said delivery pipe, a plurality of identical, equally spaced, hollow spokes leading from the center of said rotor to the rotor periphery and terminating in peripheral fluid-discharging nozzles, said nozzles sloping in the same direction and arranged at the same acute angularity with respect to tangential lines at their locations on said rotor periphery, whereby the discharging of fluid jets under pressure from said nozzles will exert a reactionary force tending to rotate said rotor in one direction, a rotor-driven shaft secured to and co-axial with said rotor, a rotatably-mounted turbine wheel surrounding said rotor and co-axial therewith, a plurality of equally-spaced blades on said turbine wheel surrounding said rotor periphery so arranged as to oppose and be operatively acted upon by the jets from said nozzles, whereby to cause rotation of said turbine wheel in a relatively opposite direction with respect to said rotor, a turbine driven shaft secured to said turbine wheel, a power take-off shaft, means connecting said take-off shaft with said rotor-driven shaft to cause rotation of said take-off shaft in one direction, means connecting said take-off shaft with said turbine-driven shaft also to cause rotation of said take-off shaft in the same direction, whereby said oppositely rotating driven shafts will cooperate in producing rotation of said take-off shaft, and selective shiftable gears in one of said means controlling the relative speed of said take-off shaft with one of said driven shafts and thereby controlling the relative speed ratio between said oppositely rotating driven shafts.

3. The combination set forth in claim 1 with the addition of a third rotating element surrounding said turbine wheel and secured to and rotating in unison with said rotor, blades on said third element positioned a slight distance beyond the outer peripheral line of said turbine wheel blades and sloping oppositely from said turbine wheel blades, whereby the actuating fluid discharged from said turbine wheel blades will be impinged upon said blades of said third element and exert a force contributing to the rotation of said combined rotor and third element.

4. In a turbine power transmitting assembly of the character described, an inner rotor, a pipe delivering fluid under pressure to the interior of said rotor, a plurality of identical, equally spaced, involute nozzles leading from the interior of said rotor to the rotor periphery, said nozzles sloping in the same direction and arranged at the same acute angularity with respect to tangential lines at their locations on said rotor periphery, whereby the discharging of fluid jets under pressure from said nozzles will exert a reactionary force tending to rotate said rotor in one direction, a rotor-driven shaft secured to and co-axial with said rotor, a rotatably-mounted turbine wheel surrounding said rotor and co-axial therewith, a plurality of equally-spaced curved blades on said turbine wheel surrounding said rotor periphery and curved oppositely from said rotor nozzles, whereby to cause rotation of said turbine wheel in an opposite direction from said rotor, a turbine driven shaft secured to said turbine wheel, a third rotating element surrounding said turbine wheel and secured to and rotating in unison with said rotor, groups of blades on said third element positioned a slight distance beyond the outer peripheral line of said turbine wheel blades and sloping oppositely from said turbine wheel blades, each of said groups composed of an arcuately extended main blade spaced substantially radially outwardly from one of said nozzles of said rotor and a series of single blades of decreasing size, whereby the actuating fluid discharged from said turbine wheel blades will be impinged upon said blades of said third element and exert a force contributing to the rotation of said combined rotor and third element, a power take-off shaft, means connecting said take-off shaft with said rotor-driven shaft to cause rotation of said take-off shaft in one direction, and means connecting said take-off shaft with said turbine driven shaft, also to cause rotation of said take-off shaft in the same direction, whereby said oppositely rotating driven shafts will cooperate in producing rotation of said take-off shaft.

5. A turbine power transmitting assembly including an inner rotor, a hollow shaft delivering fluid under pressure to the interior of said rotor, said rotor secured to said shaft, a plurality of identical, equally spaced, hollow spokes leading from the interior of said rotor to the rotor periphery and providing fluid jet orifices on the rotor periphery, the axes of said orifices sloping in the same direction and arranged at the same acute angularity on said rotor periphery, whereby the discharging of fluid jets under pressure from said orifices will exert a reactionary force tending to rotate said rotor in one direction, a rotor-driven shaft secured to and co-axial with said rotor and extending from said rotor on the opposite side from said hollow delivery shaft, a rotatably-mounted turbine wheel surrounding said rotor and co-axial therewith, a plurality of equally-spaced blades on said turbine wheel surrounding said rotor periphery so arranged as to oppose and be operatively acted upon by the jets from said rotor, whereby to cause rotation of said turbine wheel in a relatively opposite direction with respect to said rotor, a hollow turbine driven shaft secured to said turbine wheel and encompassing said rotor-driven shaft, a third rotating element surrounding said turbine wheel and secured to said first mentioned delivery shaft and therewith to said rotor, blades on said third element positioned a slight distance beyond the outer peripheral line of said turbine wheel blades and sloping oppositely from said turbine wheel blades, whereby the actuating fluid discharged from said turbine wheel blades will be impinged upon said blades of said third element and exert a force contributing to the rotation of said combined rotor and third element, a power take-off shaft, means connecting said take-off shaft with said rotor-driven shaft to cause rotation of said take-off shaft in one direction, means connecting said take-off shaft with said turbine-driven shaft also to cause rotation of said take-off shaft in the same direction, whereby said oppositely rotating driven shafts will cooperate in producing rotation of said take-off shaft, selective shiftable gears in one of said means controlling the relative speed of said take-off shaft with one of said driven shafts and thereby controlling the relative speed ratio between said oppositely rotating driven shafts, and a housing extending around said third rotating element, said housing having a channel for receiving the actuating fluid discharged from said third rotating element.

6. In a turbine power transmitting assembly, a primary rotor, means for delivering fluid under pressure to the interior of said rotor, a plurality of identical, equally spaced nozzles leading from the interior of said rotor to the rotor periphery, said nozzles sloping in the same direction and arranged at the same acute angularity on said rotor periphery, whereby the discharging of fluid jets under pressure from said nozzles will exert a reactionary force tending to rotate said rotor in one direction, a rotor-driven shaft secured to and co-axial with said rotor, a rotatably-mounted turbine wheel surrounding said rotor and co-axial therewith, a plurality of equally-spaced curved blades on said turbine wheel surrounding said rotor periphery so arranged as to oppose and be operatively acted upon by the jets from said nozzles, whereby to cause rotation of said turbine wheel in a relatively opposite direction with respect to said rotor, a hollow turbine-driven shaft secured to said turbine wheel and encompassing said rotor-driven shaft, a second turbine wheel surrounding said first mentioned turbine wheel and co-axial therewith and with said rotor, a plurality of peripheral, equally-spaced, blades on said second turbine wheel positioned a slight distance beyond the peripheral line of said first turbine wheel, and sloping oppositely from said blades on said first turbine wheel, whereby the fluid thrown off forcibly from said first turbine wheel will exert a force to rotate said second turbine wheel oppositely from said first turbine wheel and thus in the same direction as said rotor, means, including a one-way clutch, connecting said second turbine wheel with said rotor whereby any attempt by said second turbine wheel to rotate faster than said rotor will cause additional rotational force to be imparted to said rotor and therewith to said rotor driven shaft, a power take-off shaft, means connecting said take-off shaft with said rotor-driven shaft to cause rotation of said take-off shaft in one direction, and means connecting said take-off shaft with said hollow turbine-driven shaft also to cause rotation of said take-off shaft in the same direction, whereby said oppositely rotating driven shafts will cooperate in producing rotation of said take-off shaft.

7. In a turbine power transmitting assembly, a primary rotor, a hollow rotatable supporting member secured to said rotor and co-axial therewith, means for delivering fluid under pressure into said rotor through said supporting member, a plurality of groups of nozzles leading from the interior of said rotor to the rotor periphery, the discharging ends of said nozzles arranged at the same acute angularity with respect to tangential lines at their locations on said rotor periphery, a rotor-driven shaft connected with and rotated by said rotor, a rotatably-mounted first turbine wheel surrounding said rotor and co-axial therewith, groups of blades on said turbine wheel surrounding said rotor periphery so arranged as to oppose and be operatively acted upon by the jets from said nozzles, the number of blades in each group of blades corresponding to the number of nozzles in each group of nozzles and the blades in each group so positioned as to be registrable respectively with the nozzles in each group, partition walls separating the blades in each group, a turbine-driven shaft secured to said first turbine wheel, a second turbine wheel surrounding said first turbine wheel and co-axial therewith and with said rotor, groups of blades on said second turbine wheel positioned a slight distance beyond the peripheral line of said first turbine wheel, and sloping oppositely from said blades on said first turbine wheel, whereby the fluid thrown off forcibly from said first turbine wheel will exert a force to rotate said second turbine wheel oppositely from said first turbine wheel and thus in the same direction as said rotor, the number of blades in each group on said second turbine wheel corresponding to the number in each group on said first turbine wheel, means, including a one-way clutch, connecting said second turbine wheel with said hollow rotatable supporting member and thus with said rotor, whereby any attempt by said second turbine wheel to rotate faster than said rotor will cause additional rotational force to be imparted to said rotor and therewith to said rotor driven shaft, a power take-off shaft, means connecting said take-off shaft with said rotor-driven shaft to cause rotation of said take-off shaft in one direction, and means connecting said take-off shaft with said turbine-driven shaft also to cause rotation of said take-off shaft in the same direction, whereby said oppositely rotating driven shafts will cooperate in producing rotation of said take-off shaft.

8. In a turbine power transmitting assembly, a primary rotor, means for delivering fluid under pressure to the interior of said rotor, a plurality of identical, equally spaced, nozzles leading from the interior of said rotor to the rotor periphery, said nozzles sloping in the same direction and arranged at the same acute angularity on said rotor periphery, whereby the discharging of fluid jets under pressure from said nozzles will exert a reactionary force tending to rotate said rotor in one direction, a rotor-driven shaft secured to and co-axial with said rotor, a rotatably-mounted turbine wheel surrounding said rotor and co-axial therewith, a plurality of equally-spaced curved blades on said turbine wheel surrounding said rotor periphery so arranged as to oppose and be operatively acted upon by the jets from said nozzles, whereby to cause rotation of said turbine wheel in a relatively opposite direction with respect to said rotor, a turbine driven shaft secured to said turbine wheel, a second turbine wheel surrounding said first turbine wheel and co-axial therewith and with said rotor, a plurality of peripheral, equally-spaced, curved blades on said second turbine wheel positioned a slight distance beyond the peripheral line of said first turbine wheel, and curved oppositely from said blades on said first turbine wheel, whereby the fluid thrown off forcibly from said first turbine wheel will exert a force to rotate said second turbine wheel oppositely from said first turbine wheel and thus in the same direction as said rotor, means, including a one-way clutch, connecting said second turbine wheel with said rotor, whereby any attempt by said second turbine wheel to rotate faster than said rotor will cause additional rotational force to be imparted to said rotor and therewith to said rotor driven shaft, a third turbine wheel surrounding said second turbine wheel and co-axial therewith, blades on said third turbine wheel surrounding the periphery of said second turbine wheel and sloping oppositely from said blades on said second turbine wheel, means, including a one-way clutch, connecting said third turbine wheel with said turbine-driven shaft of said first turbine wheel, whereby any attempt of said third turbine wheel to rotate faster than said first turbine wheel will cause additional force to be imparted to said turbine-driven shaft, a power take-off shaft, means connecting said take-off shaft with said rotor-driven shaft to cause rotation of said take-off shaft in one direction, and means connecting said take-off shaft with said turbine-driven shaft of said first turbine wheel also to cause rotation of said take-off shaft in the same direction, whereby said oppositely rotating driven shafts will cooperate in producing rotation of said take-off shaft.

9. The combination set forth in claim 8 with the addition of selective shiftable gears in the means connecting said power take-off shaft with one of said driven shafts.

10. A turbine power transmitting assembly comprising a primary rotor, a hollow rotatable supporting member secured to said rotor and co-axial therewith, means for delivering fluid under pressure into said rotor through said supporting member, a plurality of groups of nozzles leading from the interior of said rotor to the rotor periphery, the discharging ends of said nozzles arranged at the same acute angularity with respect to trangential lines at their locations on said rotor periphery, a rotor-driven shaft connected with and rotated by said rotor, a rotatably-mounted first turbine wheel surrounding said rotor and co-axial therewith, groups of blades on said turbine wheel surrounding said rotor periphery so arranged as to oppose and be operatively acted upon by the jets from said nozzles, the number of blades in each group of blades corresponding to the number of nozzles in each group of nozzles and the blades in each group so positioned as to be registrable respectively with the nozzles in each group, partition walls separating the blades in each group, a turbine-driven shaft secured to said first turbine wheel, a second turbine wheel surrounding said first turbine wheel and co-axial therewith and with said rotor, groups of blades on said second turbine wheel positioned a slight distance beyond the peripheral line of said first turbine wheel, and sloping oppositely from said blades on said first turbine wheel whereby the fluid thrown off forcibly from said first turbine wheel will exert a force to rotate said second turbine wheel oppositely from said first turbine wheel and thus in the same direction as said rotor, the number of blades in each group on said second turbine wheel corresponding to the number in each group on said first turbine wheel, means, including a one-way clutch, connecting said second turbine wheel with said hollow rotatable supporting member and thus with said rotor, whereby any attempt by said second turbine wheel to rotate faster than said rotor will cause additional rotational force to be imparted to said rotor and therewith to said rotor driven shaft, a third turbine wheel surrounding said second turbine wheel and co-axial therewith, blades on said third turbine wheel surrounding the periphery of said second turbine wheel and sloping oppositely from said blades on said second turbine wheel, means, including a one-way clutch, connecting said third turbine wheel with said turbine-driven shaft of said first turbine wheel, whereby any attempt of said third turbine wheel to rotate faster than said first turbine wheel will cause additional force to be imparted to said turbine-driven shaft, a power take-off shaft, means connecting said take-off shaft with said rotor-driven shaft operating to drive said take-off shaft in one direction, selective shiftable gears in said last mentioned means, whereby to vary the speed ratio between said rotor and said take-off shaft, and means connecting said take-off shaft with said turbine-driven shaft of said first turbine wheel so arranged as to drive said take-off shaft also in the same direction.

References Cited in the file of this patent
UNITED STATES PATENTS

| | | |
|---|---|---|
| 2,297,259 | Speiser | Sept. 29, 1942 |
| 2,616,303 | Thurber | Nov. 4, 1952 |
| 2,616,534 | Thurber | Nov. 4, 1952 |